(12) United States Patent
Sarkar et al.

(10) Patent No.: US 11,593,906 B2
(45) Date of Patent: *Feb. 28, 2023

(54) IMAGE RECOGNITION BASED CONTENT ITEM SELECTION

(71) Applicant: Google LLC, Mountain View, CA (US)

(72) Inventors: Subhadip Sarkar, Sunnyvale, CA (US); Ravi Jain, Palo Alto, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/394,123

(22) Filed: Aug. 4, 2021

(65) Prior Publication Data

US 2021/0365984 A1    Nov. 25, 2021

Related U.S. Application Data

(63) Continuation of application No. 15/638,333, filed on Jun. 29, 2017, now Pat. No. 11,100,538, which is a
(Continued)

(51) Int. Cl.
*G06Q 30/02*    (2012.01)
*G06Q 90/00*    (2006.01)
(Continued)

(52) U.S. Cl.
CPC .......... *G06Q 90/00* (2013.01); *G06F 16/242* (2019.01); *G06F 16/5866* (2019.01);
(Continued)

(58) Field of Classification Search
CPC ............ G06K 9/6267; G06Q 30/0256; G06V 10/764; G06V 30/19173
(Continued)

(56) References Cited

U.S. PATENT DOCUMENTS 5,418,713 A    5/1995    Allen
5,498,002 A    3/1996    Gechter
(Continued)

FOREIGN PATENT DOCUMENTS

EP    0 408 348 A2    1/1991
JP    2007-072712 A    3/2007
(Continued)

OTHER PUBLICATIONS

Yeh, Tom, et al., A Picture is Worth a Thousand Keywords: Image-Based Object Search on a Mobile Platform, CHI 2005, Apr. 2005, downloaded Jun. 29, 2021 from https://dl.acm.org/doi/10.1145/1056808.1057083 (Year: 2005).*
(Continued)

*Primary Examiner* — Scott D Gartland

(74) *Attorney, Agent, or Firm* — Dority & Manning, P.A.

(57) ABSTRACT

Methods, systems, and apparatus, including computer programs encoded on a computer storage medium, for content presentation. In one aspect, a method includes receiving a request for a content item to be presented to a user; for a collection of content items, identifying one or more candidate content items including using image keywords derived from images associated with the user to identify the one or more candidate content items; selecting a content item responsive to the content request from the candidate content items; and sending the selected content item for presentation to the user.

20 Claims, 4 Drawing Sheets

Related U.S. Application Data continuation of application No. 14/190,523, filed on Feb. 26, 2014, now abandoned, which is a continuation of application No. 13/168,904, filed on Jun. 24, 2011, now Pat. No. 8,688,514.

(51) Int. Cl.
| | |
|---|---|
| *G06Q 30/0251* | (2023.01) |
| *G06F 16/242* | (2019.01) |
| *G06F 16/58* | (2019.01) |
| *G06F 16/9535* | (2019.01) |
| *G06K 9/62* | (2022.01) |

(52) U.S. Cl.
CPC ....... *G06F 16/9535* (2019.01); *G06K 9/6267* (2013.01); *G06Q 30/0256* (2013.01)

(58) Field of Classification Search
USPC ................................................ 705/14.54
See application file for complete search history.

(56) References Cited

U.S. PATENT DOCUMENTS

| | | | |
|---|---|---|---|
| 5,572,643 A | 11/1996 | Judson | |
| 5,602,565 A | 2/1997 | Takeuchi | |
| 5,634,850 A | 6/1997 | Kitahara et al. | |
| 5,682,511 A | 10/1997 | Sposato et al. | |
| 5,748,173 A | 5/1998 | Gur | |
| 5,774,664 A | 6/1998 | Hidary et al. | |
| 5,778,181 A | 7/1998 | Hidary et al. | |
| 5,831,591 A | 11/1998 | Suh | |
| 5,845,263 A | 12/1998 | Camaisa et al. | |
| 5,856,821 A | 1/1999 | Funahashi | |
| 6,011,537 A | 1/2000 | Slotznick | |
| 6,018,768 A | 1/2000 | Ullman et al. | |
| 6,026,373 A | 2/2000 | Goodwin III | |
| 6,185,558 B1 | 2/2001 | Bowman et al. | |
| 6,199,060 B1 | 3/2001 | Gustman | |
| 6,275,806 B1 | 8/2001 | Pertrushin | |
| 6,320,602 B1 | 11/2001 | Burkardt et al. | |
| 6,505,169 B1 | 1/2003 | Bhagavath et al. | |
| 6,510,553 B1 | 1/2003 | Hazra | |
| 6,570,587 B1 | 5/2003 | Efrat et al. | |
| 6,591,247 B2 | 7/2003 | Stern | |
| 6,642,940 B1 | 11/2003 | Dakss et al. | |
| 6,684,249 B1 | 1/2004 | Frerichs et al. | |
| 6,823,495 B1 | 11/2004 | Vedula et al. | |
| 6,857,007 B1 | 2/2005 | Bloomfield | |
| 6,947,531 B1 | 9/2005 | Lewis et al. | |
| 7,124,101 B1 | 10/2006 | Mikurak | |
| 7,158,676 B1 | 1/2007 | Rainsford | |
| 7,302,254 B2 | 11/2007 | Valloppillil | |
| 7,526,786 B1 | 4/2009 | Adams et al. | |
| 7,647,242 B2 | 1/2010 | Bem | |
| 7,660,815 B1 | 2/2010 | Scofield et al. | |
| 7,668,821 B1 | 2/2010 | Donsbach et al. | |
| 7,831,472 B2 | 11/2010 | Yufik | |
| 7,853,255 B2 | 12/2010 | Karaoguz et al. | |
| 7,979,459 B2 | 7/2011 | Wu et al. | |
| 8,065,611 B1 | 11/2011 | Chan et al. | |
| 8,073,868 B2 | 12/2011 | Lavi | |
| 8,090,222 B1 | 1/2012 | Baluja et al. | |
| 8,108,253 B2 | 1/2012 | Poon et al. | |
| 8,126,766 B2 | 2/2012 | Alexander | |
| 8,135,619 B2 | 3/2012 | Bem | |
| 8,136,028 B1* | 3/2012 | Loeb .................. | G06F 16/951 715/201 |
| 8,180,667 B1* | 5/2012 | Baluja .................. | H04N 21/2743 705/14.19 |
| 8,195,133 B2 | 6/2012 | Ramer et al. | |
| 8,301,499 B2 | 10/2012 | Moissinac et al. | |
| 8,386,386 B1 | 2/2013 | Zhu | |
| 8,391,618 B1 | 3/2013 | Chuang et al. | |
| 8,463,783 B1 | 6/2013 | Yagnik | |
| 8,583,471 B1* | 11/2013 | Voskuhl ............. | G06Q 30/0254 705/7.33 |
| 8,688,514 B1 | 4/2014 | Sarkar et al. | |
| 8,903,716 B2 | 12/2014 | Chen et al. | |
| 9,122,645 B1* | 9/2015 | Amidon .................. | G06Q 10/10 |
| 9,189,514 B1 | 11/2015 | Myslinski | |
| 9,304,738 B1 | 4/2016 | Xu et al. | |
| 9,535,887 B2 | 1/2017 | Ozgul | |
| 9,875,740 B1 | 1/2018 | Kumar et al. | |
| 9,959,129 B2 | 5/2018 | Kannan et al. | |
| 10,056,078 B1 | 8/2018 | Shepherd et al. | |
| 10,068,573 B1 | 9/2018 | Aykac et al. | |
| 10,276,170 B2 | 4/2019 | Gruber et al. | |
| 10,417,037 B2 | 9/2019 | Gruber et al. | |
| 10,565,256 B2 | 2/2020 | Badr et al. | |
| 2001/0045948 A1 | 11/2001 | Shiiyama | |
| 2002/0032603 A1 | 3/2002 | Yeiser | |
| 2002/0045988 A1 | 4/2002 | Yokota | |
| 2002/0053078 A1 | 5/2002 | Holtz et al. | |
| 2002/0065722 A1 | 5/2002 | Hubbard et al. | |
| 2002/0133571 A1 | 9/2002 | Jacob et al. | |
| 2003/0018541 A1 | 1/2003 | Nohr | |
| 2003/0028873 A1 | 2/2003 | Lemmons | |
| 2003/0033161 A1 | 2/2003 | Walker et al. | |
| 2003/0040957 A1 | 2/2003 | Rodriguez et al. | |
| 2003/0074662 A1 | 4/2003 | Istvan et al. | |
| 2003/0187844 A1 | 10/2003 | Li et al. | |
| 2004/0044569 A1 | 3/2004 | Roberts et al. | |
| 2004/0260621 A1 | 12/2004 | Foster et al. | |
| 2005/0125683 A1 | 6/2005 | Matsuyama et al. | |
| 2005/0138016 A1 | 6/2005 | Matsuyama et al. | |
| 2005/0187823 A1 | 8/2005 | Howes | |
| 2005/0188400 A1 | 8/2005 | Topel | |
| 2005/0220439 A1 | 10/2005 | Carton et al. | |
| 2005/0261968 A1 | 11/2005 | Randall et al. | |
| 2005/0288096 A1 | 12/2005 | Walker et al. | |
| 2006/0004627 A1 | 1/2006 | Baluja | |
| 2006/0064411 A1 | 3/2006 | Gross et al. | |
| 2006/0247999 A1 | 11/2006 | Gonen et al. | |
| 2006/0293995 A1 | 12/2006 | Borgs et al. | |
| 2007/0094042 A1 | 4/2007 | Ramer et al. | |
| 2007/0094081 A1 | 4/2007 | Yruski et al. | |
| 2007/0097975 A1 | 5/2007 | Rakers et al. | |
| 2007/0118525 A1* | 5/2007 | Svendsen ............. | H04L 67/1063 707/999.009 |
| 2007/0123222 A1 | 5/2007 | Cox et al. | |
| 2007/0127688 A1 | 6/2007 | Doulton | |
| 2007/0174258 A1 | 7/2007 | Jones et al. | |
| 2007/0288309 A1 | 12/2007 | Haberman et al. | |
| 2008/0021953 A1 | 1/2008 | Gil | |
| 2008/0060001 A1 | 3/2008 | Logan et al. | |
| 2008/0066107 A1 | 3/2008 | Moonka et al. | |
| 2008/0086368 A1 | 4/2008 | Bauman et al. | |
| 2008/0091537 A1 | 4/2008 | Miller et al. | |
| 2008/0107404 A1 | 5/2008 | Nakamura et al. | |
| 2008/0109306 A1 | 5/2008 | Maigret et al. | |
| 2008/0120276 A1 | 5/2008 | Chennavasin | |
| 2008/0172422 A1 | 7/2008 | Li et al. | |
| 2008/0187279 A1 | 8/2008 | Gilley et al. | |
| 2008/0201220 A1 | 8/2008 | Broder et al. | |
| 2008/0222132 A1 | 9/2008 | Pan et al. | |
| 2008/0235087 A1 | 9/2008 | Amento et al. | |
| 2008/0243821 A1 | 10/2008 | Delli Santi et al. | |
| 2008/0263583 A1 | 10/2008 | Heath | |
| 2008/0268876 A1* | 10/2008 | Gelfand .................. | H04W 4/02 455/457 |
| 2008/0270538 A1 | 10/2008 | Garg et al. | |
| 2008/0281684 A1 | 11/2008 | Stefanik et al. | |
| 2008/0319844 A1 | 12/2008 | Hua et al. | |
| 2009/0163227 A1 | 6/2009 | Collins | |
| 2009/0179900 A1 | 7/2009 | Petrovic et al. | |
| 2009/0254971 A1 | 10/2009 | Herz et al. | |
| 2009/0265236 A1 | 10/2009 | Schultz et al. | |
| 2009/0307013 A1 | 12/2009 | Altounian et al. | |
| 2009/0324107 A1 | 12/2009 | Walch | |
| 2010/0094686 A1 | 4/2010 | Henshaw et al. | |
| 2010/0104145 A1 | 4/2010 | Momosaki | |

(56) References Cited

U.S. PATENT DOCUMENTS

| | | |
|---|---|---|
| 2010/0111196 A1 | 5/2010 | Lynch et al. |
| 2010/0287056 A1 | 11/2010 | Koningstein et al. |
| 2010/0290699 A1 | 11/2010 | Adam et al. |
| 2011/0161130 A1 | 6/2011 | Whalin et al. |
| 2011/0208822 A1 | 8/2011 | Rathod |
| 2011/0238500 A1 | 9/2011 | Kim |
| 2011/0246027 A1 | 10/2011 | Miyajima |
| 2011/0246285 A1 | 10/2011 | Ratnaparkhi et al. |
| 2011/0295847 A1 | 12/2011 | Cucerzan et al. |
| 2012/0054015 A1 | 3/2012 | Wu |
| 2012/0059713 A1 | 3/2012 | Galas et al. |
| 2012/0072280 A1 | 3/2012 | Lin |
| 2012/0095828 A1 | 4/2012 | Evankovich et al. |
| 2012/0105868 A1 | 5/2012 | Nomura et al. |
| 2012/0150657 A1 | 6/2012 | Rubinstein et al. |
| 2012/0159620 A1 | 6/2012 | Seifert et al. |
| 2012/0224768 A1 | 9/2012 | Lee |
| 2012/0265528 A1 | 10/2012 | Gruber et al. |
| 2012/0265761 A1 | 10/2012 | Atsmon et al. |
| 2012/0290566 A1 | 11/2012 | Dasher et al. |
| 2012/0294520 A1 | 11/2012 | Mei et al. |
| 2013/0091453 A1 | 4/2013 | Kotler et al. |
| 2013/0117022 A1 | 5/2013 | Chen et al. |
| 2013/0120544 A1 | 5/2013 | Du et al. |
| 2013/0268507 A1 | 10/2013 | MacBeth et al. |
| 2013/0272570 A1 | 10/2013 | Sheng et al. |
| 2013/0275164 A1 | 10/2013 | Gruber et al. |
| 2013/0290172 A1 | 10/2013 | Mashinsky |
| 2013/0304758 A1 | 11/2013 | Gruber et al. |
| 2013/0318089 A1 | 11/2013 | Tan et al. |
| 2014/0222436 A1 | 8/2014 | Binder et al. |
| 2014/0278411 A1 | 9/2014 | Cheung |
| 2014/0278528 A1 | 9/2014 | Simha et al. |
| 2014/0280015 A1 | 9/2014 | Marantz et al. |
| 2014/0324851 A1 | 10/2014 | Tholiya et al. |
| 2014/0351241 A1 | 11/2014 | Leask et al. |
| 2014/0351261 A1 | 11/2014 | Aswani et al. |
| 2015/0161147 A1 | 6/2015 | Zhao et al. |
| 2015/0199731 A1 | 7/2015 | Jevtic et al. |
| 2015/0227504 A1 | 8/2015 | Zhang et al. |
| 2015/0256633 A1 | 9/2015 | Chand et al. |
| 2015/0278878 A1 | 10/2015 | Chau |
| 2015/0370914 A1 | 12/2015 | Carroll et al. |
| 2016/0063106 A1 | 3/2016 | Chai et al. |
| 2016/0104212 A1 | 4/2016 | Saligrama Ananthanarayana et al. |
| 2016/0210689 A1 | 7/2016 | Hummel |
| 2016/0212455 A1 | 7/2016 | Manna |
| 2016/0315995 A1 | 10/2016 | Hausler et al. |
| 2017/0024766 A1 | 1/2017 | Thomson et al. |
| 2017/0061515 A1 | 3/2017 | Hummel |
| 2017/0076316 A1 | 3/2017 | Heffernan et al. |
| 2017/0092278 A1 | 3/2017 | Evermann et al. |
| 2017/0110130 A1 | 4/2017 | Sharifi et al. |
| 2017/0110144 A1 | 4/2017 | Sharifi et al. |
| 2017/0132019 A1 | 5/2017 | Karashchuk et al. |
| 2017/0178686 A1 | 6/2017 | Li et al. |
| 2017/0323230 A1 | 11/2017 | Bailey et al. |
| 2017/0358301 A1 | 12/2017 | Raitio et al. |
| 2018/0040020 A1 | 2/2018 | Kurian et al. |
| 2018/0097940 A1 | 4/2018 | Beilis et al. |
| 2018/0277113 A1 | 9/2018 | Hartung et al. |
| 2018/0300745 A1 | 10/2018 | Aubespin et al. |

FOREIGN PATENT DOCUMENTS

| | | | |
|---|---|---|---|
| JP | 2009-048446 A | 3/2009 | |
| JP | 2015-528140 | 9/2015 | |
| KR | 10-2000-0017807 A | 4/2000 | |
| WO | WO-02/37470 A2 | 5/2002 | |
| WO | WO-02/080555 A2 | 10/2002 | |
| WO | WO-2011054054 A1 * | 5/2011 | ............ G06Q 30/02 |
| WO | WO-2011/088053 A2 | 7/2011 | |
| WO | WO-2018/125299 A1 | 7/2018 | |

OTHER PUBLICATIONS

Fergus, R. et al., Learning Object Categories from Google's Image Search, Tenth IEEE International Conference on Computer Vision (ICCV'05), vol. 1, dated Oct. 17-21, 2005, published Dec. 5, 2005 (Year: 2005).*

"10 Tips to Improve the Performance of Google Product Listing Ads", Foghorn Labs, retrieved Mar. 18, 2013 from URL: http://www.foghornlabs.com/2012/11/21/product-listing-ads-best-practices/ (5 pages).

"About Us", YuMe Networks, 2007, retrieved Nov. 26, 2007 from URL: http://yumenetworks.com/about.html (1 page).

"CrunchBase: ScanScout", CrunchBase Company Profile, Jul. 24, 2007, retrieved Nov. 26, 2007 from URL: http://www.crunchbase.com/company/ScanScout (3 pages).

"'Dolphin' attacks fool Amazon, Google voice assistants", BBC News, Sep. 7, 2017 (8 pages).

"Google Assistant SDK", Google Developers Newsletter, Google Developers, developers.google.com, accessed on Jul. 12, 2017 (2 pages).

"Introducing Adap.tv for Advertisers", Adap.tv, 2011, retrieved Mar. 11, 2011 from URL: http://www.adap.tv/demo.html (1 page).

"Introducing Hypervideo", Asterpix Interactive Video, 2007, retrieved Nov. 26, 2007 from URL: http://www.asterpix.com/help/learnmore/introducing/ (1 page).

"MeToday Jul. 4, 2007", Viddler.com, Jul. 4, 2007, retrieved Mar. 11, 2011 from URL: http://www.viddler.com/explore/djsteen/videos/27/ (1 page).

"Microsoft for Digital Advertising Industry", PR Newswire, New York, Jan. 13, 2006, pp. 1-4, ProQuest Document ID 968489271, retrieved Nov. 27, 2010 (4 pages).

"Ooyala Blog: Create the Group", Ooyala, retrieved Mar. 11, 2011 from URL: http//www.ooyala.com/blog (11 pages).

Ooyala: Overview, Ooyala, retrieved Nov. 26, 2007 from URL: http://www.ooyala.com/about (2 pages).

"Products Feed Specification", Google Merchant Center Help, Google, Inc., retrieved Mar. 18, 2013 from URL: http://www.support.google.com/merchants/bin/answer.py?hl=en&answer=188494#US (6 pages).

"Supported File Formats", Google Merchant Center Help, Google, Inc., retrieved Mar. 18, 2013 from URL: http://www.support.google.com/merchants/bin/answer.py?hl=en&answer=160567 (1 page).

"Walmart and Google to offer voice-enabled shopping", BBC News, Aug. 23, 2017 (10 pages).

"What's Hot on Shopping.com", Shopping.com, 2011, retrieved Mar. 11, 2001 from URL: http://shopping.com (2 pages).

Abrams, Brad, "Help users find, interact & re-engage with your app on the Google Assistant", Google Developers Blog, Nov. 15, 2017 (16 pages).

Advisory Action for U.S. Appl. No. 15/638,333 dated Feb. 28, 2020 (4 pages).

Albrecht, Chris, "Alexa, How Can You Be Used in Restaurants?", The Spoon, Dec. 10, 2017 (6 pages).

Amazon, "Echo Look | Hands-Free Camera and Style Assistant", retrieved Aug. 22, 2017 from URL: https://www.amazon.com/gp/product/B0186JAEWK?ref%5F=cm%5Fsw%5Fr%5Ffa%5Fdp%5Ft2%5FC5oazbJTKCB18&pldnSite=1 (7 pages).

Applicant Initiated Interview Summary for U.S. Appl. No. 15/638,324 dated Feb. 28, 2020 (5 pages).

Arrington, Michael, "AdBrite Makes Brilliant Video Product", TechCrunch, Jan. 4, 2007, retrieved Mar. 11, 2011 from URL: http://www.techcrunch.com/2007/1/4/adbrite-makes-brilliant-video-product (1 page).

Arrington, Michael, "Cisco and Click.tv?", TechCrunch, Jul. 30, 2007, retrieved Nov. 26, 2007 from URL: http://www.techcrunch.com/2007/07/30/cisco-and-clicktv/ (5 pages).

Arrington, Michael, "Click.tv Moves Video Ideas Forward", TechCrunch, Apr. 16, 2006, retrieved Mar. 11, 2011 from URL: http://www.techcrunch.com/2006/04/16/clicktv-moves-video-ideas-forward/ (6 pages).

(56) References Cited

OTHER PUBLICATIONS

Arrington, Michael, "FuckedCompany's Adbrite Spawn Goes 2.0", TechCrunch, Nov. 6, 2006, retrieved Mar. 11, 2011 from URL: https://techcrunch.com/2006/11/05/fuckedcompanys-adbrite-spawn-goes-20/ (5 pages).
Arrington, Michael, "Hulu Makes First Acquisition; Chinese Video Startup to Form Backbone of New Service", TechCrunch, Sep. 12, 2007, retrieved Nov. 26, 2007 from URL: http://www.techcrunch.com/2007/09/12/hulu-makes-first-acquisition-chinese-video-startup-to-form-backbone-of-new-service/ (6 pages).
Barr, Jeff, "AWS DeepLens—Get Hands-On Experience with Deep Learning With Our New Video Camera", AWS News Blog, Nov. 29, 2017 (11 pages).
Broussard, Mitchel, "Chatbot-Like Siri Patent Includes Intelligent Image, Video, and Audio Recognition Within Messages", Mac Rumors, May 11, 2017, retrieved Jul. 12, 2017 from URL: https://www.macrumors.com/2017/05/11/siri-chatbot-like-patent/ (11 pages).
Buckland et al., "Amazon's Alexa Takes Open-Source Route to Beat Google Into Cars", Bloomberg, Feb. 27, 2018 (6 pages).
Chen, Lulu Yilun, "Alibaba Challenges Google, Amazon With New Echo-Like Device", Bloomberg, Jul. 5, 2017, retrieved Jul. 12, 2017 from URL: https://www.bloomberg.com/news/articles/2017-07-05/alibaba-challenges-google-amazon-with-new-echo-like-device (3 pages).
Close, Kerry, "Amazon Echo Will Give You These Deals If You Order Through Alexa This Weekend," Time.com, Nov. 18, 2016 (2 pages).
Clover, Juli, "Amazon and Google Want to Turn Their Smart Home Speakers Into Telephone Replacements", MacRumors, Feb. 15, 2017 (5 pages).
Coberly, Cohen, "Apple patent filing reveals potential whispering Siri functionality", Techspot, Dec. 14, 2017 (4 pages).
Collins, et al., "Can Twitter Save Itself?", CNET, Apr. 26, 2017, retrieved Aug. 22, 2017 from URL: https://www.cnet.com/news/twitter-q1-2017-earnings/ (3 pages).
Communication pursuant to Article 94(3) EPC dated Feb. 22, 2019 for Appl. Ser. No. 17768558.3 (8 pages).
Cook, John, "A Siri for advertising: These mobile ads talk back to you," GeekWire, Apr. 1, 2013, geekwire.com (7 pages).
Corrected Notice of Allowability for U.S. Appl. No. 15/395,689 dated Sep. 9, 2020 (2 pages).
Crist, Ry, "Logitech Harmony's Alexa skill just got a whole lot better", CNET, Jul. 13, 2017 (2 pages).
Decision of Rejection for JP Appln. Ser. No. 2019-135381 dated Mar. 1, 2021 (6 pages).
Dominguez, Catherine, "BroadRamp technology will make TV shows virtual mall", San Antonio Business Journal, Jun. 8, 2007, retrieved Nov. 26, 2007 from URL: http://cincinnati.bizjournals.com/sanantonio/stories/2007/06/11story2.html?t=printable (3 pages).
Estes, Adam Clark, "Amazon's Newest Gadget Is a Tablet That's Also an Echo", Gizmodo, Sep. 19, 2017 (3 pages).
Examination Report for EP Appln. Ser. No. 17768558.3 dated Apr. 3, 2020 (9 pages).
Examination Report for IN Appln. Ser. No. 201747045160 dated Apr. 28, 2020 (7 pages).
Final Office Action for U.S. Appl. No. 13/295,507 dated Mar. 24, 2016 (37 pages).
Final Office Action for U.S. Appl. No. 13/295,507 dated Oct. 30, 2013 (14 pages).
Final Office Action for U.S. Appl. No. 13/932,836 dated Apr. 12, 2017 (15 pages).
Final Office Action for U.S. Appl. No. 13/932,836 dated Jul. 8, 2016 (12 pages).
Final Office Action for U.S. Appl. No. 13/932,836 dated Jun. 24, 2015 (9 pages).
Final Office Action for U.S. Appl. No. 14/190,523 dated Dec. 3, 2014 (8 pages).
Final Office Action for U.S. Appl. No. 14/190,523 dated May 7, 2018 (28 pages).
Final Office Action for U.S. Appl. No. 14/190,523 dated Nov. 25, 2015 (6 pages).
Final Office Action for U.S. Appl. No. 14/278,473 dated Sep. 23, 2016 (7 pages).
Final Office Action for U.S. Appl. No. 15/190,897 dated May 18, 2018 (33 pages).
Final Office Action for U.S. Appl. No. 15/395,689 dated Mar. 22, 2019 (13 pages).
Final Office Action for U.S. Appl. No. 15/395,689 dated Mar. 5, 2020 (14 pages).
Final Office Action for U.S. Appl. No. 15/584,746 dated Apr. 2, 2019 (14 pages).
Final Office Action for U.S. Appl. No. 15/638,304 dated Nov. 16, 2020 (11 pages).
Final Office Action for U.S. Appl. No. 15/638,324 dated Jan. 26, 2021 (24 pages).
Final Office Action for U.S. Appl. No. 15/638,324 dated Jan. 3, 2020 (29 pages).
Final Office Action for U.S. Appl. No. 15/638,333 dated Dec. 17, 2019 (19 pages).
Final Office Action for U.S. Appl. No. 15/638,333 dated Jan. 28, 2021 (19 pages).
First Office Action for CN Appln. Ser. No. 20178001369.6 dated Jul. 3, 2020 (18 pages).
Forrest, Conner, "Essential Home wants to be 'bridge' between Amazon Alexa, Apple's Siri, and Google Assistant," TechRepublic, May 31, 2017 (9 pages).
Foxx, Chris, "Apple reveals HomePod smart speaker", BBC, Jun. 5, 2017 (9 pages).
Gebhart, Andrew, "Google Assistant is spreading, but it needs its own 'Echo Dot'", CNET, May 20, 2017 (6 pages).
Gebhart, Andrew, "Google Home to the Amazon Echo: 'Anything you can do . . . '", CNET, May 18, 2017 (7 pages).
Gibbs, Samuel, "Your Facebook Messenger app is about to be filled with ads", The Guardian, Jul. 12, 2017, retrieved Aug. 22, 2017 from URL: https://www.theguardian.com/technology/2017/jul/12/facebook-messenger-app-adverts (3 pages).
Golgowski, Nina, "This Burger King Ad Is Trying to Control Your Google Home Device", HuffPost, Apr. 12, 2017 (7 pages).
Gonzalez, Nick, "Video Ads: Every Startup Has a Different Solution", TechCrunch, Jul. 6, 2007, retrieved Nov. 26, 2007 from URL: http://www.techcrunch.com/2007/07/06/video-ads-somebody-needs-to-solve-this-problem/ (14 pages).
Gonzalez, Nick, "YuMe Closes $9 Million Series B", TechCrunch, Oct. 16, 2007, retrieved Mar. 16, 2011 from URL: http://techcrunch.com/2007/10/16/yume-closes-9-million-series-b/ (1 page).
Gurman et al., "Apple Is Manufacturing a Siri Speaker to Outdo Google and Amazon", Bloomberg, May 31, 2017 (3 pages).
Hardwick, Tim, "Facebook Smart Speaker Coming Next Year With 15-inch Touch Panel", MacRumors, Jul. 25, 2017 (5 pages).
Heater, Brian, "Amazon Alexa devices can finally tell voices apart", TechCrunch, Oct. 11, 2017 (6 pages).
Hendrickson, Mark, "Time Warner Invests in Video Ads Startup ScanScout", TechCrunch, Sep. 9, 2007, retrieved Mar. 11, 2011 from URL: http://www.techcrunch.com/2007/09/09/time-warner-backs-video-ads-through-scanscout/ (6 pages).
International Preliminary Report on Patentability, Ch. I, for PCT Appln. Ser. No. PCT/US2017/049713 dated Jul. 11, 2019 (8 pages).
International Preliminary Report on Patentablity, Ch. I, for PCT Appln. Ser. No. PCT/US2008/084982 dated Jun. 10, 2010 (5 pages).
International Search Report and Written Opinion for PCT Appln. Ser. No. PCT/US2008/84982 dated Jun. 23, 2009 (8 pages).
International Search Report and Written Opinion for PCT Appln. Ser. No. PCT/US2017/049713 dated Oct. 25, 2017 (12 pages).
Johnston, Lisa, "Amazon Whirlwind: New Echo, Plus, Spot, Connect, Fire TV Take the Stage", Twice, Sep. 27, 2017 (10 pages).
Kelion, Leo, "Amazon revamps Echo smart speaker family", BBC News, Sep. 27, 2017 (11 pages).
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (3 pages).
Krishna, Swapna, "Jim Beam's smart decanter will pour you a shot when you ask", engadget, Nov. 29, 2017 (3 pages).

(56) References Cited

OTHER PUBLICATIONS

Lacy, Lisa, "Improving search and advertising are the next frontiers for voice-activated devices", TechCrunch, Dec. 20, 2017 (13 pages).
Larson, Selena, "Google Home now recognizes your individual voice", CNN Money, San Francisco, California, Apr. 20, 2017 (3 pages).
Lee, Dave, Take Two for Samsung's troubled Bixby assistant, BBC News, Oct. 19, 2017 (6 pages).
Lee, Dave, "The five big announcements from Google I/O", BBC, May 18, 2017 (11 pages).
Lund, Pamela, "Mastering Google Product Feeds and Product Listing Ads—Part 1", retrieved Dec. 28, 2013 from URL: http://www.blueglass.com/blog/mastering-google-product-feeds-and-product-listing-ads-part-1/#comments (17 pages).
Nieva, Richard, "Google Home and eBay can tell you how much that's worth", CNET, Mar. 8, 2017 (3 pages).
Non-Final Office Action for U.S. Appl. No. 11/948,643 dated Dec. 9, 2010 (21 pages).
Non-Final Office Action for U.S. Appl. No. 13/168,904 dated Aug. 7, 2013 (9 pages).
Non-Final Office Action for U.S. Appl. No. 13/295,507 dated Jul. 23, 2015 (19 pages).
Non-Final Office Action for U.S. Appl. No. 13/295,507 dated May 10, 2013 (10 pages).
Non-Final Office Action for U.S. Appl. No. 13/490,912 dated Apr. 16, 2013 (31 pages).
Non-Final Office Action for U.S. Appl. No. 13/490,912 dated Aug. 2, 2012 (25 pages).
Non-Final Office Action for U.S. Appl. No. 13/932,836 dated Aug. 16, 2017 (15 pages).
Non-Final Office Action for U.S. Appl. No. 13/932,836 dated Feb. 12, 2015 (9 pages).
Non-Final Office Action for U.S. Appl. No. 13/932,836 dated Nov. 16, 2015 (10 pages).
Non-Final Office Action for U.S. Appl. No. 13/932,836 dated Nov. 2, 2016 (12 pages).
Non-Final Office Action for U.S. Appl. No. 14/190,523 dated Apr. 2, 2015 (6 pages).
Non-Final Office Action for U.S. Appl. No. 14/190,523 dated Aug. 17, 2015 (8 pages).
Non-Final Office Action for U.S. Appl. No. 14/190,523 dated Aug. 21, 2014 (7 pages).
Non-Final Office Action for U.S. Appl. No. 14/190,523 dated Feb. 22, 2017 (9 pages).
Non-Final Office Action for U.S. Appl. No. 14/190,523 dated Jun. 6, 2016 (6 pages).
Non-Final Office Action for U.S. Appl. No. 14/190,523 dated May 20, 2016 (7 pages).
Non-Final Office Action for U.S. Appl. No. 14/190,523 dated May 26, 2015 (6 pages).
Non-Final Office Action for U.S. Appl. No. 14/278,473 dated May 3, 2016 (17 pages).
Non-Final Office Action for U.S. Appl. No. 15/190,897 dated Dec. 7, 2017 (34 pages).
Non-Final Office Action for U.S. Appl. No. 15/190,897 dated Nov. 16, 2018 (39 pages).
Non-Final Office Action for U.S. Appl. No. 15/395,689 dated Aug. 21, 2019 (13 pages).
Non-Final Office Action for U.S. Appl. No. 15/395,689 dated Sep. 13, 2018 (13 pages).
Non-Final Office Action for U.S. Appl. No. 15/584,746 dated Oct. 29, 2018 (14 pages).
Non-Final Office Action for U.S. Appl. No. 15/584,940 dated Aug. 14, 2017 (15 pages).
Non-Final Office Action for U.S. Appl. No. 15/638,304 dated Dec. 2, 2019 (10 pages).
Non-Final Office Action for U.S. Appl. No. 15/638,304 dated Jul. 1, 2019 (10 pages).
Non-Final Office Action for U.S. Appl. No. 15/638,304 dated Mar. 7, 2019 (12 pages).
Non-Final Office Action for U.S. Appl. No. 15/638,324 dated Jul. 2, 2020 (35 pages).
Non-Final Office Action for U.S. Appl. No. 15/638,324 dated Jul. 8, 2019 (27 pages).
Non-Final Office Action for U.S. Appl. No. 15/638,333 dated Aug. 6, 2020 (25 pages).
Non-Final Office Action for U.S. Appl. No. 15/638,333 dated Jun. 26, 2019 (19 pages).
Notice of Allowance for U.S. Appl. No. 11/948,643 dated Feb. 27, 2012 (12 pages).
Notice of Allowance for U.S. Appl. No. 13/168,904 dated Jan. 10, 2014 (8 pages).
Notice of Allowance for U.S. Appl. No. 13/490,912 dated Jan. 7, 2014 (17 pages).
Notice of Allowance for U.S. Appl. No. 13/932,836 dated Dec. 18, 2017 (7 pages).
Notice of Allowance for U.S. Appl. No. 14/278,473 dated Oct. 31, 2016 (15 pages).
Notice of Allowance for U.S. Appl. No. 15/190,897 dated Aug. 27, 2019 (14 pages).
Notice of Allowance for U.S. Appl. No. 15/190,897 dated May 6, 2019 (15 pages).
Notice of Allowance for U.S. Appl. No. 15/190,897 dated Oct. 25, 2019 (16 pages).
Notice of Allowance for U.S. Appl. No. 15/395,689 dated Jul. 29, 2020 (7 pages).
Notice or Allowance for U.S. Appl. No. 15/395,588 dated Oct. 28, 2020 (7 pages).
Notice of Allowance for U.S. Appl. No. 15/584,746 dated Aug. 7, 2019 (8 pages).
Notice of Allowance for U.S. Appl. No. 15/584,746 dated Feb. 11, 2021 (5 pages).
Notice of Allowance for U.S. Appl. No. 15/584,746 dated Feb. 12, 2020 (5 pages).
Notice of Allowance for U.S. Appl. No. 15/584,746 dated Jul. 31, 2020 (5 pages).
Notice of Allowance for U.S. Appl. No. 15/584,940 dated Feb. 26, 2018 (9 pages).
Notice of Allowance for U.S. Appl. No. 15/584,940 dated Jan. 30, 2018 (9 pages).
Notice of Allowance for U.S. Appl. No. 15/638,304 dated May 6, 2021 (11 pages).
Notice of Allowance for U.S. Appl. No. 15/638,324 dated Jun. 16, 2021 (13 pages).
Notice of Allowance for U.S. Appl. No. 15/638,333 dated Jul. 13, 2021 (12 pages).
Notice of Reasons for Rejection for JP Appln. Ser. No. 2019-135381 dated Aug. 17, 2020 (11 pages).
Novet, et al., "Amazon is getting ready to bring Alexa to work", CNBC, Nov. 29, 2017 (4 pages).
Office Action for DE Appl. Ser. No. 112017000122.6 dated Sep. 5, 2018 (1 page).
Office Action for JP Appln. Ser. No. 2017-556891 dated Feb. 18, 2019 (13 pages).
Office Action for KR Appln. Ser. No. 10-2017-7031189 dated Nov. 29, 2018 (12 pages).
Palladino, Valentina, "Garmin teamed up with Amazon to make a tiny Echo Dot for your car", ars Technica, Oct. 17, 2017 (2 pages).
Perez, Sarah, "Alexa's 'Routines' will combine smart home control with other actions, like delivering your news and weather", TechCrunch, Sep. 28, 2017 (10 pages).
Perez, Sarah, "The first ad network for Alexa Skills shuts down following Amazon's policy changes", TechCrunch, Jun. 15, 2017 (8 pages).
Porter, Jon, "Amazon Echo Show release date, price, news and features", TechRadar, Jun. 26, 2017 (11 pages).
Pringle, Ramona, "'I'm sorry to hear that': Why training Siri to be a therapist won't be easy", CBC News, Sep. 24, 2017 (3 pages).
Purcher, Jack, "Apple Patent Reveals a New Security Feature Coming to Siri", Patently Apple, Apr. 4, 2017, reprinted from http://www.patentlyapple.com/patently-apple/2017/04/apple-patent-reveals-a-new-security-feature-coming-to-siri.html (6 pages).

(56) References Cited

OTHER PUBLICATIONS

Purcher, Jack, "The Patent behind Google Home's new Feature of Understanding Different Voices in the Home Surfaced Today", Patently Mobile, Apr. 20, 2017, reprinted from http://www.patentlymobile.com/2017/04/the-patent-behind-google-homes-new-feature-of-understanding-different-voices-in-the-home-surfaced-today.html (3 pages).
Purcher, Jack, "Today Google Home's Virtual Assistant can learn its Owner's voice for Security Reasons like Apple's Patent Pending Idea", Patently Apple, Apr. 20, 2017 (4 pages).
Riley, Duncan, "Contextual In-Video Advertising: ScanScout", TechCrunch, May 14, 2007, retrieved Mar. 11, 2011 from URL: http://www.techcrunch.com/2007/0514/contextual-in-video=-advertising-scanscout/ (5 pages).
Rubinstein et al., "A Life More Photographic; Mapping the Networked Image", Photographies, vol. 1, No. 1, Mar. 2008, doi:10.1080/17540760701785842 (22 pages).
Sablich, Justin, "Planning a Trip With the Help of Google Home", New York Times, dated May 31, 2017 (6 pages).
Second Office Action for CN Appln. Ser. No. 201780001369.6 dated Apr. 8, 2021 (7 pages).
Seifert, Dan, "Samsung's new virtual assistant will make using your phone easier", The Verge, Mar. 20, 2017 (6 pages).
Sherr, Ian, "IBM built a voice assistant for cybersecurity", CNET, Feb. 13, 2017 (9 pages).
Siegal, Daniel, "IP Attys Load up Apps' Legal Challenges at 'Silicon Beach'", Law360, Los Angeles, California, Feb. 2, 2017 (4 pages).
Simonite, Tom, "How Alexa, Siri, and Google Assistant Will Make Money off You," Technology Review, May 31, 2016, technologyreview.com (9 pages).
Simonite, Tom, "How Assistant Could End up Eating Google's Lunch," Technology Review, Sep. 23, 2016, technologyreview.com (8 pages).
Smith, Dave, "The Amazon Echo got 2 incredibly useful features thanks to a new update", Business Insider, Jun. 1, 2017 (2 pages).
Supplemental Notice of Allowability for U.S. Appl. No. 15/395,689 dated Jan. 6, 2021 (2 pages).
Willens, Max, "For publishers, Amazon Alexa holds promise but not much money (yet)", DIGIDAY, Jul. 6, 2017 (5 pages).
Yamato et al., "Ubiquitous Service Composition Technology for Ubiquitous Network Environments", NTT Network Service Systems Laboratories, NTT Corporation, vol. 48 No. 2, Feb. 2007, pp. 562-577 (16 pages).
Yardi et al., "Photo-Based Authentication Using Social Networks", WOSN '08 (Workshop on Online Social Networks), Aug. 18, 2008, retrieved Jun. 7, 2021 from URL: http://conferences.sigcomm.org/sigcomm/2008/workshops/wosn/papers/p55.pdf (5 pages).
Yeh et al., "A Picture is Worth a Thousand Keywords: Image-Based Object Search on a Mobile Platform", CHI 2005, Late Breaking Results: Short Papers, Apr. 2-7, 2005, Portland, Oregon, pp. 2025-2028 (4 pages).

* cited by examiner

IMAGE RECOGNITION BASED CONTENT ITEM SELECTION

CROSS-REFERENCE TO RELATED APPLICATIONS

This application claims the benefit of priority under 35 U.S.C. § 120 as a continuation of U.S. patent application Ser. No. 15/638,333, filed Jun. 29, 2017, which claims the benefit of priority under 35 U.S.C. § 120 as a continuation of U.S. patent application Ser. No. 14/190,523, filed Feb. 26, 2014, which claims the benefit of priority under 35 U.S.C. § 120 as a continuation of U.S. patent application Ser. No. 13/168,904, filed Jun. 24, 2011, each of which are hereby incorporated herein by reference in their entirety.

BACKGROUND

Computing systems can present content items. However, it may be challenging for a computing system to select content when there is minimal context.

SUMMARY

This specification describes technologies relating to content presentation.

In general, one aspect of the subject matter described in this specification can be embodied in methods that include the actions of receiving a request for an ad to be presented to a user; for a collection of ads, identifying one or more candidate ads including using image keywords derived from images associated with the user to identify the one or more candidate ads; selecting an ad responsive to the ad request from the candidate ads; and sending the selected ad for presentation to the user. Other embodiments of this aspect include corresponding systems, apparatus, and computer programs recorded on computer storage devices, each configured to perform the operations of the methods.

These and other embodiments can each optionally include one or more of the following features. The image keywords are derived from images uploaded by the user. The images include images captured by the user using a camera of a mobile device. The image keywords are derived from images selected by the user. Selecting an ad responsive to the ad request includes determining a similarity between one or more keywords associated with each ad of the collection of ads and the image keywords. Determining the similarity include calculating a similarity score for each ad and where selecting the ad responsive to the ad request includes using a combination of the similarity score and one or more other scores for each. Each image keyword is associated with a scoring weight for scoring the respective image keywords relative to the ads in the collection of ads and where the weight decreases according to age of the image keyword. The ad request is the first ad request following user image activity. The image content is used to directly infer the user's intent.

Particular embodiments of the subject matter described in this specification can be implemented so as to realize one or more of the following advantages. Using keywords derived from images uploaded or selected by a user provides information for presenting ads directed to the user's interests. Images can provide context for identifying ads in situations where there may be little context available, for example, for mobile applications. Images can also provide user intent directly. For example, if the input image is for a digital camera, the system can identify suitable ads based on the image content.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Images can be used to provide context for selecting ads. In particular, images associated with a user can provide context in situations where there is little context available, for example, when serving ads to mobile applications. The image context can include one or more keywords derived from images associated with particular users. For example, users can upload images (for example, to a photo album, a search system, or mail system as an attachment), which can be processed to identify keywords. Alternatively, images selected by users (e.g., in response to presented image search results) can be processed to identify keywords. These keywords can be used to identify particular ads for presentation to the respective users in response to an ad request.

While reference will be made below to content selection systems and methods, other forms of content including other forms of content items can be managed, presented, and logged in accordance with the description below.

Figure 1:
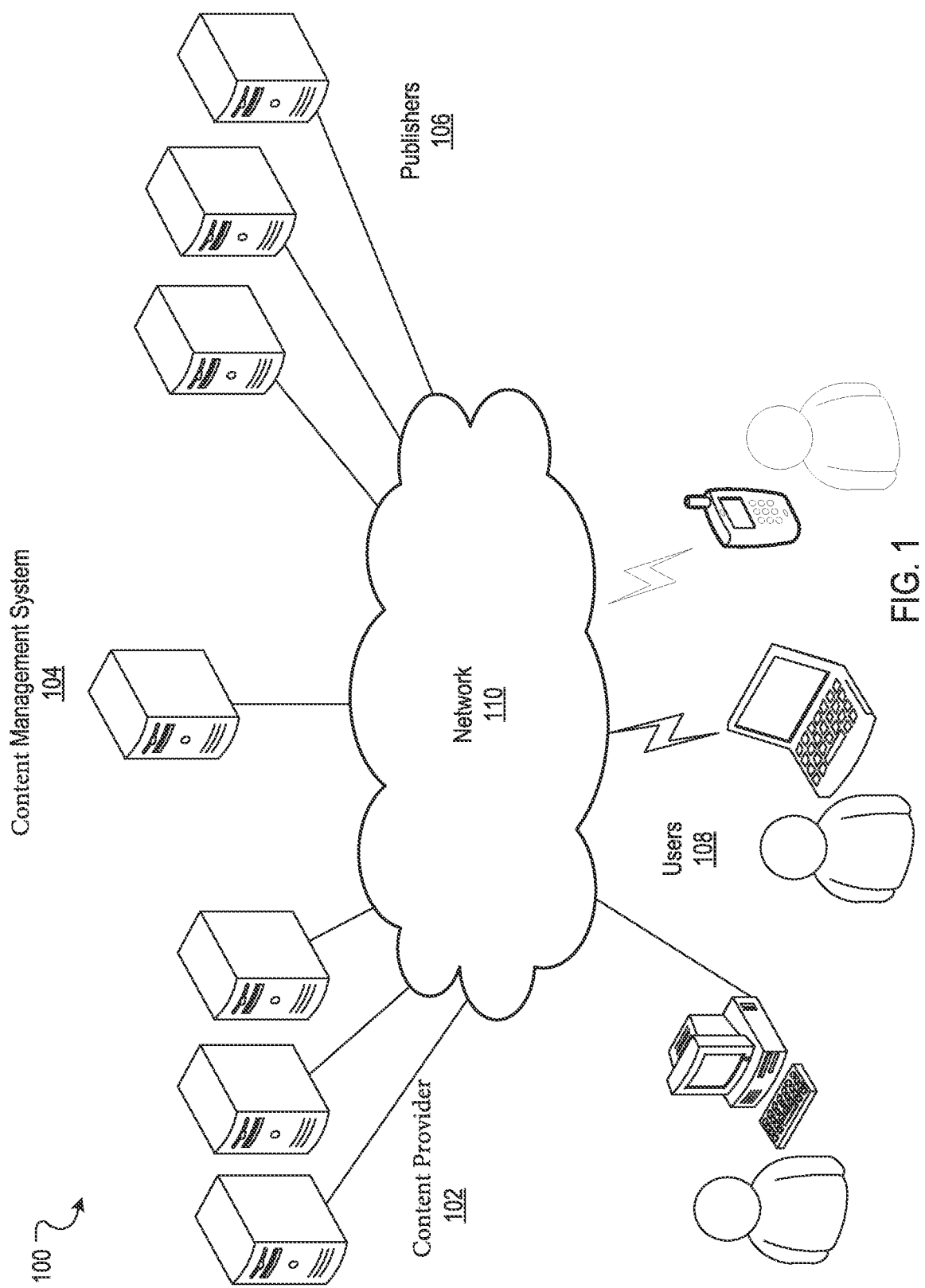
FIG. 1 is a diagram of an example content presentation system.

FIG. 1 is a block diagram of an example content presentation system 100. In some implementations, one or more content providers 102 can directly, or indirectly, enter, maintain, and log ad information in an content management system 104 ("system 104"). Though reference is made to content selection, other forms of content, including other forms of sponsored content, can be delivered by the system 100. The ads can be in the form of graphical ads, for example, banner ads, text only ads, image ads, barcode ads (e.g., ads that include one or more barcodes, for example, for use in redeeming the particular ad), audio ads, video ads, animated ads, ads combining one or more of any of such components, etc. The ads can also include embedded information, such as links, meta-information, and/or machine executable instructions. One or more users 108 may submit requests for ads to the system 104. The system 104 responds by sending ads to the requesting users 108 for placement on or association with one or more of a publisher's 106 content items (e.g., web properties, mobile applications, or other third party content). Example web properties can include web pages, television and radio content item slots, or print media space.

Users 108 and the content providers 102, can provide usage information to the system 104, for example, whether or not a conversion (e.g., a purchase or other interaction) or a click-through related to an ad (e.g., a user has selected an ad) has occurred. This usage information can include measured or observed user behavior related to ads that have been served. The system 104 may perform financial transactions, for example, crediting the publishers 106 and charging the content providers 102 based on the usage information.

A network 110, such as a local area network (LAN), wide area network (WAN), the Internet, one or more telephony networks or a combination thereof, connects the content providers 102, the system 104, the publishers 106, and the users 108.

One example publisher 106 is a general content server that receives requests for content (e.g., articles, discussion threads, music, video, graphics, search results, web page listings, information feeds, etc.), and retrieves the requested content in response to the request.

The user 108 can submit a request for ads to a content server in the system 104. The ad request can include a number of ads desired. The ad request can also include content request information, including information associated with the user 108 or the user's device (e.g., a mobile device), as described in greater detail below.

In some implementations, a client browser, application, or other content provider, combines the requested content with one or more of the ads provided by the system 104. The combined content and ads can be rendered to the users 108 that requested the content for presentation in a viewer (e.g., a browser, application interface, or other content display system) of a user device. The user device can transmit information about the ads back to the content server, including information describing how, when, and/or where the ads are to be rendered (e.g., in HTML or JavaScript™). In some implementations, the content and ads are combined separately. For example, content can be rendered while waiting for ads to be received and incorporated into the content.

Another example publisher 106 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and may be grouped into a predetermined number of (e.g., ten) search results. In some implementations, the search results can be presented to users with one or more ads.

A user 108, or the user's device, can submit a request for ads to the system 104. The request may include a number of ads desired. The system 104 can use various information to identify a group of ads to provide to the user 108. Ads from this group of ads can be provided by the user's device for presentation in response to a request from a user application, or associated with content to be displayed (e.g., a web page or search results). Thus, ads can be provided directly to the user device for presentation or indirectly through content provided to the user device (e.g., ads presented with search results where the ads are provided to the user with the search results).

In some implementations, the content management system 104 can use an auction process to select ads from the content providers 102, which can then be provided to the users 108 in response to the receive requests for ads. For example, the content providers 102 may be permitted to select, or bid, an amount the content providers are willing to pay for each presentation of or interaction with (e.g., click) of an ad, e.g., a cost-per-click amount an content provider pays when, for example, a user clicks on an ad. The cost-per-click can include a maximum cost-per-click, e.g., the maximum amount the content provider is willing to pay for each click of an ad based on a keyword, e.g., a word or words in a query. Other bid types, however, can also be used. Based on these bids, ads can be selected and ranked for presentation.

The user 108 can combine the search results with one or more of the ads provided by the system 104. This combined information can then be displayed by the devices of the users 108 that requested the content. Alternatively, portions can be received at different times and integrated in the display as received. For example, the ads can be received and rendered separately by a browser or application. The search results can be maintained as distinct from the ads, so as not to confuse the user between paid ads and presumably neutral search results.

In some implementations, one or more publishers 106 provide web properties to the users 108. The users 108 submit requests for ads to the content management system 104. The system 104 responds by sending ads to the requesting users 108 for placement on one or more web properties (e.g., websites and other network-distributed content) that are relevant to the web property. In some implementations, the user's device identifies a particular ad from the received ads for presentation with the provided web properties. In some implementations, the requests are executed by devices associated with the user 108, e.g., by the execution of a particular script (e.g., JavaScript™) when the publisher's web page is loading on a client device.

Another example publisher 106 is a mobile application developer. A mobile application is an application specifically designed for operation on a mobile device (e.g., a smart phone). The mobile application can also include ads positioned within the content of the mobile application. Similar to publishers 106 described above, the ads can be received from the content management system 104 for placement in the mobile application when accessed by a user (e.g., when a particular page of a mobile application is loaded on the mobile device).

Figure 2:
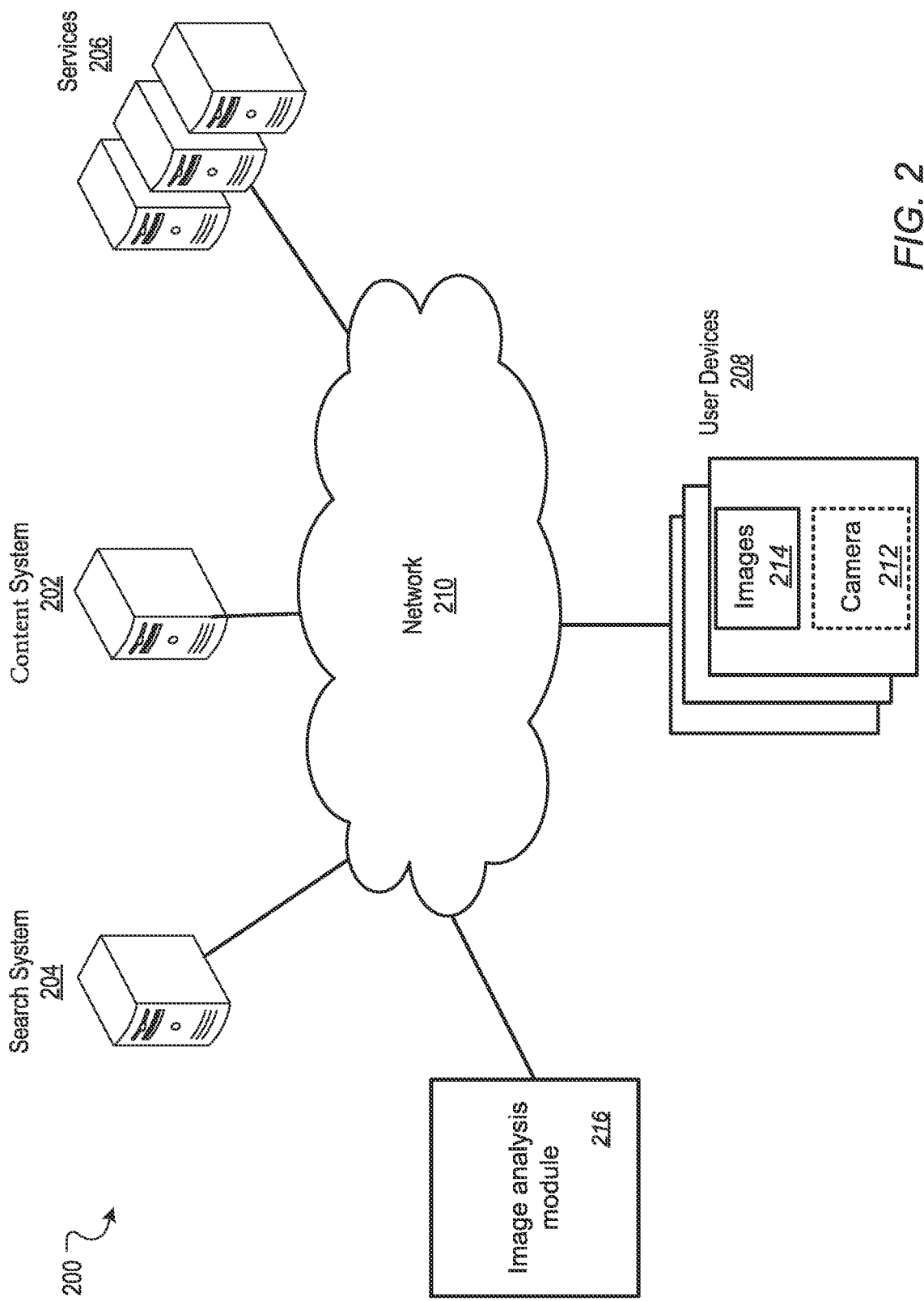
FIG. 2 is a diagram of an example system.

FIG. 2 is a diagram of an example system 200. The example system 200 includes a content system 202, a search system 204, services 206, and an image analysis module 216, each of which can communicate through one or more network 210.

The content system 202 provides ads for presentation to users (e.g., of user devices 208) in response to ad requests. The ad requests can be received from the user devices 208 or from other sources, for example, the search system 204 or content publishers (not shown). The content system 202 can use image keywords associated with particular users to identify candidate ads to provide to the user devices 208.

The search system 204 can provide search results to the user devices 208 responsive to received queries. In some implementations, the search results are image search results, for example, thumbnail images corresponding to image resources responsive to the received query. Users presented with image search results can select particular images from the image search results in order to view the corresponding image resource. Image search results can be provided with one or more ads, for example, in a particular portion or portions of the search user interface. In some implementations, the search system 204 includes an image search in which users can submit images as a query (e.g., an image taken from a camera on a mobile device).

The services 206 can include network photo albums or other photo repositories to which individual users can upload images. The services 206 can also include a mail service where, for example, users can receive images in messages or can attach images in massages to be sent to others.

The user devices 208 can include mobile devices, desktop computing devices, notebook computing devices, personal data assistants, tablet devices, etc. One or more of the user devices 208 can include a camera 212. The camera 212 can be a still camera or a video camera. The camera 212 can be, for example, a camera integrated into the device (e.g., a mobile device with an integrated camera) or a camera attached to a user device (e.g., a webcam attached to a desktop computer).

The user devices 208 also includes images 214. The images 214 can include images captured using camera 212 or from various other sources. For example, a user can transfer images from a digital camera to the images 214. In another example, a user can receive images from other users or network locations (e.g., by downloading the images or receiving images by e-mail). One or more images from the images 214 can also be uploaded to network locations using the network 210. For example, a user can upload one or more images to a web album provided by the services 206 or as a query to an image search provided by the search system 204. In some implementations, the images are encrypted prior to being uploaded.

The image analysis module 216 can analyze images uploaded, for example, to search system 204 or to services 206 in order to identify image keywords. The image analysis module 216 can also analyze images selected by users, for example, from presented image search results. The image analysis module 216 can then send the image keywords to the ad system 202. Image analysis is described in greater detail below. In some implementations, the image analysis module 216 is part of a system affiliated with each of the search system 204, ad system 202, and image services 206. In some other implementations, the image analysis module 216 is a component of one or more of the search system 204, ad system 202, and image services 206. In some implementations, the images are encrypted prior to being uploaded to the image analysis module 216. Additionally, uploaded images can be stored in a protected database and/or not logged into the system.

Figure 3:
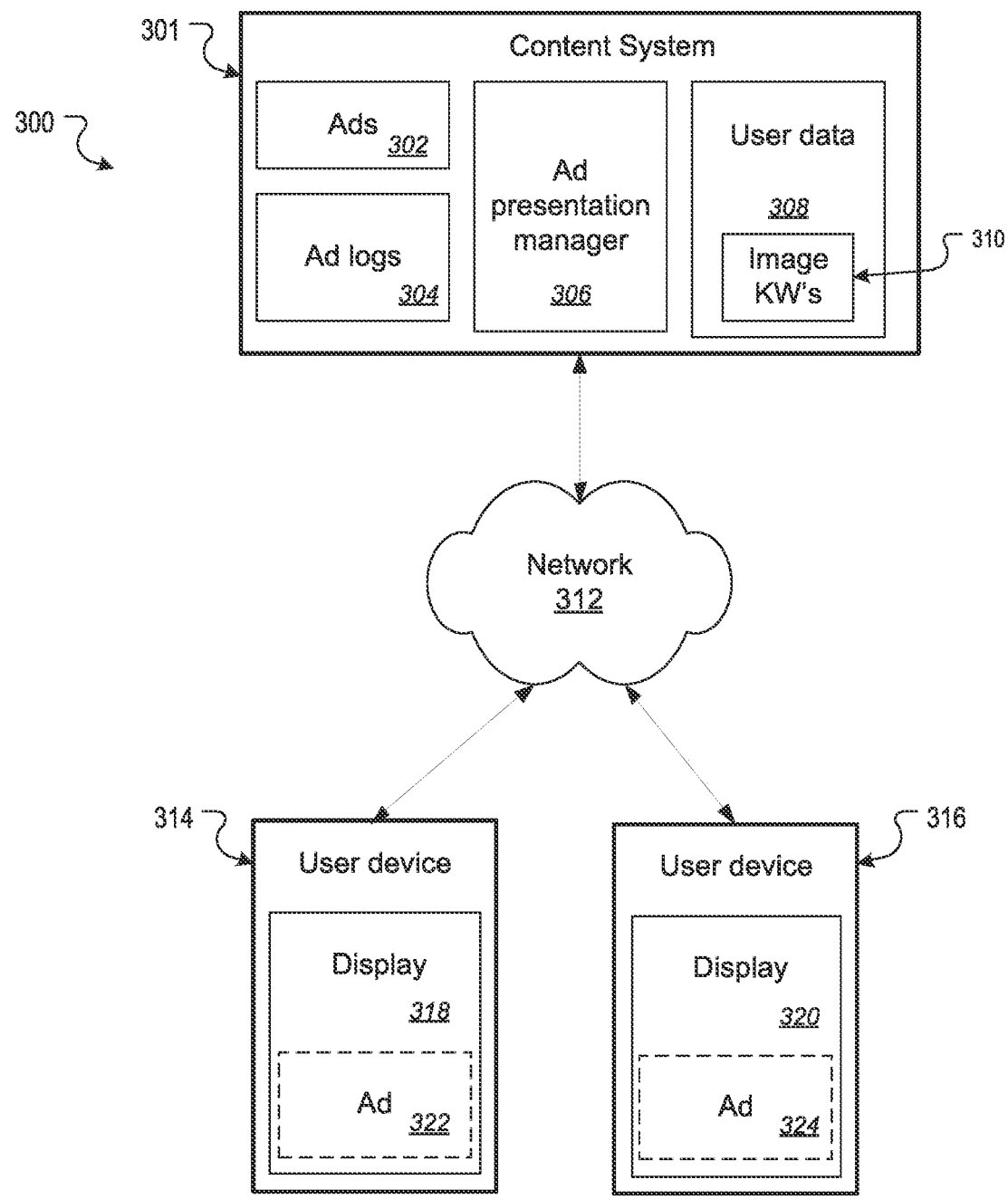
FIG. 3 is an example system for serving ads.

FIG. 3 is an example system 300 for serving ads. The system 300 includes an ad system 301, user device 314, and user device 316. The ad system 301 can communicate with each of the user devices 314 and 316 through a network 312.

The ad system 301 includes ads 302, ad logs 304, ad presentation manager 306, and user data 308.

The ads 302 are a collection of ads available for presentation to users. Each ad can include associated information used to determine whether the ad should be presented to a user in response to a request, for example, keywords associated with the ad and demographic goals for the ad (e.g., particular groups to which the ad is directed). The ad presentation manager 306 can select ads for presentation on user devices. The ad logs 304 can store presentation and conversion events (e.g., users an ad is presented to, time stamps, ad identifiers, device identifiers, wallet status of ads, user ad selections, publisher conversion events, etc.).

The ad presentation manager 306 can determine which ad or ads of the ads 302 to select for presentation (e.g., on user device 314 and/or user device 316) in response to an ad request. For example, the ad presentation manager 306 can identify and rank candidate ads from the ads 302 based on particular criteria in order to match ads with requested content, a requesting API for an application, and/or a requesting user.

The ad presentation manager 306 can identify candidate ads for selection based on keywords associated with the ads in the collection that correspond with the ad request. In some implementations, the ad keywords can be matched with the requested content in which the ads are to be presented (e.g., matching ad keywords to keywords in requested content or query terms). For example, each ad of the ads 302 can include one or more keywords for identifying ads as directed to particular subject matter that can be matched to the ad request. Thus, particular ads can be identified as relevant to particular users. Candidate ads for selection can be identified based on how well the keywords match the request.

In another example, the ad presentation manager 306 uses information about a user (e.g., user profile information, other information) to identify candidate ads for selection. For example, particular ads in the ads 302 can include group information (e.g., intended for women between the ages of 30 and 35). This information can be compared with the user information to determine whether or not an ad is a candidate ad for selection.

In yet another example, the ad presentation module 306 can send ads to an application based on the specific application requesting the ads (e.g., the ads are for products or services that appeal to a typical user of the particular application) or based on user interactions with the application.

The ad presentation manager 306 can further use image keywords associated with the user in identifying ads for presentation, for example, by matching image keywords with ad keywords to identify ad candidates. In some implementations, image keywords are only used to identify ads in particular circumstances. For example, when other sources of information are insufficient or unavailable (e.g., lack of other user information or lack of information associated with the content with which the ad is to be presented). In another example, image keywords are only used within a particular time window of the user image activity (e.g., when the associated image is also associated with the ad request or the ad request follows particular image activity, for example, an image upload or selection). In some implementations, the image is used to identify a primary user intent, e.g., if the user submits an image to the image search system in order to obtain information regarding the image. For example, if the user uploads a particular image, the content of that image can be used to identify relevant ads to present to the user.

In some implementations, an auction system is used to determine which ad from candidate ads matching criteria for the content will be selected for presentation or to adjust scores for candidate ads. In some other implementations, the candidate ad having a highest score is selected for presentation. The selected ad can then be sent for presentation to the user (e.g., sent directly to the user device or sent to a publisher or other content provider for integration prior to providing the content to the user device).

The user data 308 can include user information such as user profile information that can be used by the ad presentation manager 306 in identifying matching ads. The user data 308 also includes image keywords 310. The image keywords are keywords derived from particular images associated with each particular user. In some implementations, the keywords are derived in response to a user uploading an image (e.g., an image taken using a camera on a user device) to a search system. For example, the user can upload an image to be used as a search query. In some other implementations, the keywords are derived in response to a user uploading an image to an image service, for example, to an online photo album. Another image source associated with the user includes images received by or sent to the user using e-mail. A further image source can be images selected by the user, e.g., based on presented image search results.

In some implementations, one or more of the search system and services are affiliated with the ad system in order to facilitate the sharing of derived keyword information.

The image keywords can be derived from various techniques. These keywords can then be provided to the ad system 301 for storage within the image keywords 310. In some implementations, images associated with the user are directly analyzed. For example, an image can be analyzed to identify text within the image (e.g., using optical character recognition techniques). Identified words or phrases from the image can then be considered keywords. For example an image including a visible sign reading "Tour Eiffel" can yield as keywords "Eiffel" and "Tour". Additionally, the image can be identified for particular patterns matching known objects. For example a picture of a car can be matched with an image in an image database. Images in the database can have a particular descriptor or caption which can also be used as keywords (e.g., "Peugeot 504").

In some implementations, images associated with the user are indirectly analyzed. For example, an image (or a discernable object within the image) is matched with existing objects in an image database and metadata associated with those existing objects in the image database are analyzed to obtain keywords. For example, the photo may be similar to a photo from an online guidebook of Paris, and any metadata about the latter (URL, anchor text, etc.) can be analyzed to obtain keywords, e.g. www.paris.example.com/eiffel may yield "paris" and "eiffel" as keywords. Additionally, when a URL is identified, the target location (e.g., a web page) can be crawled to obtain keywords.

In some other implementations, referring search terms can be used to identify keywords. For example, once a matching image is found, search history logs (for images search or any other property) can be analyzed to identify which search queries led to (a) that image being served as a search result and (b) resulted in the image being selected. The search terms can be considered keywords, and their importance can be weighted based on the frequency of occurrence as well as whether they led to a selection of the image. For example, the image from the online guidebook of Paris may be served when the user types "Paris" or "Eiffel", but clicked more often in the latter case.

The keywords obtained from these methods can be ranked based on various information and filtered to identify the most likely keywords. Additionally, the image keywords can be expanded for each image or user based on vertical information (e.g., higher level categories associated with the identified keywords, for example, "France" for the keyword "Paris"). For example, a system that generates keywords for the image can compute a confidence weight associated with an image-keyword pair and provide that to the ad presentation system. These weights can be used to identify dominant keywords for particular images.

In some implementations, the keywords can be also compared with historical logs to identify best performing keywords for the image (or some representation of the concepts the image contains). Different measures of performance can be used to identify best performing keywords including, for example, aggregated click through rate on the ads, user's refinement of the query in the context of a search etc. From an ad presentation perspective, preference can be given to commercial keywords that the content providers are directing their ads to. Additionally, data from the user's past queries and/or interactions can be used to rank the keywords. For example, if the system knows (e.g., based on past user information) that the user owns a camera of a particular brand, keywords that represent accessories for the particular camera brand can be preferred.

In some implementations, user information is anonymized to obscure the user's identify. For example, received information from users (e.g., user interactions, location, device or user identifiers) can be aggregated or removed/obscure (e.g., replace user identifier with random identifier) so that individually identifying information is anonymized while still maintaining the attributes or characteristics associated with particular information (e.g., types of user actions). In some other implementations, the received information is anonymized (so that the originating user device or user device user is unidentifiable) at the user device before transmission to the system that analyzes the received inputs. In this way, the actions of individual users can be obscured or unobservable while still permitting analysis of user information. Additionally, users can opt-in or opt-out of making data for images associated with the user available to the ad system (e.g., for use in identifying appropriate ads). In some implementations, a notification procedure is used to prompt the user and a user interface can be provided to transparently view and modify privacy settings.

In some implementations, users can specify types of images that can be analyzed. For example, the user can specify that only images uploaded in particular contexts are included. Thus, the user can specify that images uploaded to a search system can be used but not those uploaded to a private album or to a social site. In some implementations, the system has default settings that can be modified by a user. The default settings can be designed to be overly limiting on the criteria for using images associated with the user.

In some other implementations, the system or user can specify particular types of images that are not analyzed or used to identify keywords. For example, images can be processed, on a network location or on the client device, to identify images containing people. As a result of the processing, for example, images recognized as having people can be excluded while images recognized as containing objects can be used.

The user devices 314 and 316 each include a respective display 318 and 320 for presenting content to the user of the device. For example, the display can be used to present application content. The display can also be used to present publisher content or search result content using a web browser. The display of content can include the presentation of one or more ads e.g., ad 322 or ad 324.

Figure 4:
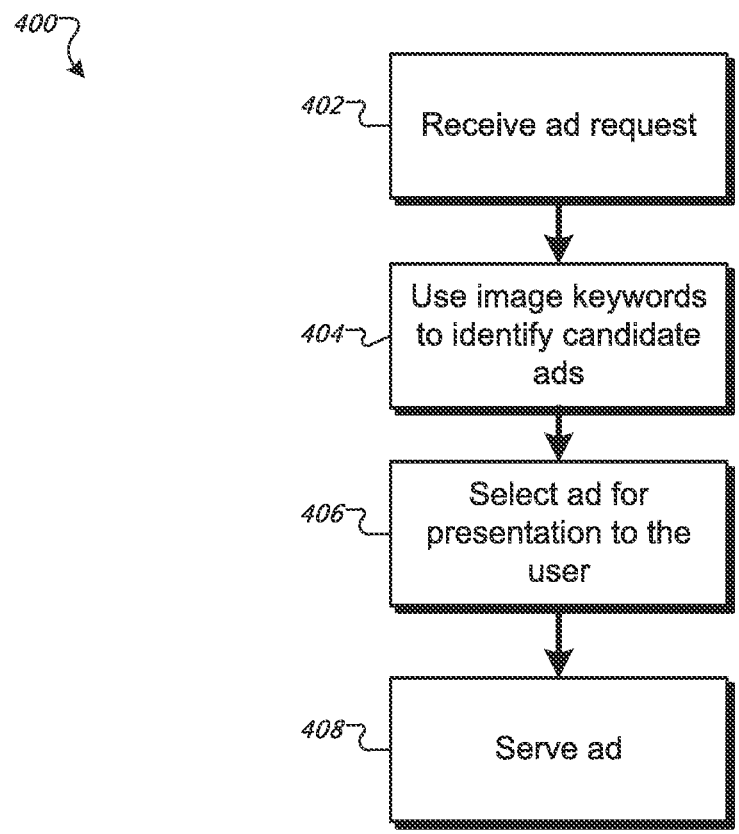
FIG. 4 is an example process for presenting ads to users.

FIG. 4 is an example process 400 for presenting ads to users. The process 400 can be performed by a system including one or more computing devices. For example, the process 400 can be performed by an ad system, e.g., the ad system 300 of FIG. 3.

An ad request is received (402). The ad request can be received by an ad system from a publisher. For example, a publisher can request an ad to be provided for content to be served to the user device. The ad can be provided to the publisher for inclusion in the content prior to sending to the user device or, alternatively, the ad can be served directly to the user device.

In some other implementations, the client device requests the ad from the ad system. For example, the user device can request an ad in response to rendering content from the publisher. A script in received web page content form a publisher can prompt the user device browser to send an ad request. Alternatively, presenting particular application content (e.g., content in a mobile application) can prompt an ad request to be sent to the ad system.

In response to the received ad request, candidate ads are identified using image keywords (404). Image keywords associated with the user can be identified based on the ad request. For example, the ad request can include a user identifier for the user. Image keywords associated with that user can be identified and compared with ad keywords. Ads can be scored based on the degree of match between the ad keywords and the identified image keywords associated with the user. Candidate ads can include ads having a threshold score or a specified number of top scoring ads. In some implementations, the score of the image keyword matching alone is used to identify candidate ads.

In some other implementations, the image keyword matching score is combined with one or more other scores to generate overall ad scores (e.g., scores based on the content to be presented or user demographic information).

In some implementations, the score for the image keyword matching can be discounted according to the age of the image keyword (e.g., how long ago the particular image keywords were added). Thus, keywords associated with more recent user image activity is weighted more heavily than older user image activity. A specified decay function can be used to adjust the image keyword weight.

In some implementations, the ad request is sent contemporaneously with analysis of a particular image such that the image keywords are associated with recent user activity. For example, an ad can be presented directly in response to a received image, where the ad is selected based on image keywords derived from the received image. This can occur, for example, when the image is uploaded through a content provider that includes one or more ads. For example, a user can attach an image to an e-mail message in an e-mail interface that includes one or more ads. The attached image can be analyzed and used to determine a next ad to present to the user (e.g., when the ads are refreshed in the e-mail interface). In some other implementations, the received image keywords are used to identify subsequent ad or ads to be presented to the user.

A particular ad of the candidate ads is selected for presentation to the user (406). In some implementations, a candidate ad having a highest overall score is selected for presentation to the user. The score can be calculated using a combination of scores for a variety of types of information including a score for the matching of image keywords to ads. In some other implementations, an auction process is used to identify a particular ad of the candidate ads for presentation.

The selected ad is sent for presentation (408). In some implementations, the ad is sent directly to the client device associated with the ad request. The ad can then be incorporated into particular content (e.g., application content). In some other implementations, the ad is sent to a content provider that incorporates the ad into the content before providing the content to the user device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
    a data processing system including one or more processors and memory to execute instructions, the data processing system to:
    receive, via an application executed by a computing device connected to a network, an image captured by a camera of the computing device;
    determine to select content for presentation via the computing device;
    analyze the image to identify a pattern that matches a predetermined pattern of an object stored in an image pattern database comprising a plurality of predetermined patterns of objects;
    determine, based on a setting established for the computing device that prevents keyword identification for images that contain an excluded object, that keyword identification is authorized for the object of the image;
    determine, responsive to the determination that keyword identification is authorized for the object, a performance of a plurality of keywords associated with the object based on interactions via the computing device with content that is selected using the plurality of keywords for presentation to the computing device;
    identify, responsive to analysis of the image and based on the performance of the plurality of keywords when used to select the content for presentation to the computing device, one or more image keywords from the plurality of keywords associated with the image based on the predetermined pattern of the object that matches the image;
identify a plurality of content items having one or more keywords, the plurality of content items different from the image captured by the camera of the computing device, wherein each of the plurality of content items present audio output, and the plurality of content items are provided by one or more third party content providers;
determine a score for each of the plurality of content items based on a comparison of the one or more image keywords with the one or more keywords of each of the plurality of content items, wherein the score indicates a degree of match between the one or more image keywords and the one or more keywords of each of the plurality of content items;
select, based on the score for each of the plurality of content items, a content item comprising audio; and
provide, to the computing device, the content item comprising the audio to cause the computing device to play the audio.

2. The system of claim 1, comprising the data processing system to:
determine an age for the one or more image keywords;
generate, for each of the plurality of content items, a weighted score based on the score for each of the plurality of content items and the age for the one or more image keywords; and
select the content item based on the weighted score.

3. The system of claim 2, comprising:
the data processing system to determine the age for the one or more image keywords based on when the image was captured by the camera of the computing device relative to the determination to select content.

4. The system of claim 2, comprising:
the data processing system to determine the age for the one or more image keywords based on when the one or more image keywords were identified from the analysis of the image captured by the camera of the computing device relative to the determination to select content for presentation via the computing device.

5. The system of claim 2, comprising:
the data processing system to generate the weighted score via application of a weight to the score based on a decay function and the age of the one or more image keywords.

6. The system of claim 2, comprising the data processing system to:
receive a request for content for presentation via the computing device;
determine to select the content for presentation via the computing device responsive to the request; and
determine the age for the one or more image keywords based on when the one or more image keywords were identified from the analysis of the image captured by the camera of the computing device relative to the determination to select content for presentation via the computing device.

7. The system of claim 1, comprising the data processing system to:
receive a request for content for presentation via the computing device; and
determine to select the content for presentation via the computing device responsive to the request.

8. The system of claim 1, comprising the data processing system to:
identify a request for content for presentation via the computing device; and
determine to select the content for presentation via the computing device responsive to the identification of the request.

9. The system of claim 1, comprising:
the data processing system to determine the score for each of the plurality of content items based on matching the one or more keywords for each of the plurality of content items with the one or more image keywords.

10. The system of claim 1, comprising the data processing system to:
expand the one or more image keywords to include categories; and
determine the score for each of the plurality of content items based on matching the one or more keywords for each of the plurality of content items with the one or more image keywords including the categories.

11. The system of claim 1, wherein the camera comprises a still camera or a video camera.

12. The system of claim 1, wherein the computing device comprises a digital assistant.

13. A method, comprising:
receiving, by a data processing system including one or more processors and memory, via an application executed by a computing device connected to a network, an image captured by a camera of the computing device;
determining, by the data processing system, to select content for presentation via the computing device;
analyzing, by the data processing system, the image to identify a pattern that matches a predetermined pattern of an object stored in an image pattern database comprising a plurality of predetermined patterns of objects;
determining, by the data processing system based on a setting established for the computing device that prevents keyword identification for images that contain an excluded object, that keyword identification is authorized for the object of the image;
determining, by the data processing system responsive to the determination that keyword identification is authorized for the object, a performance of a plurality of keywords associated with the object based on interactions via the computing device with content that is selected using the plurality of keywords for presentation to the computing device;
identifying, by the data processing system, responsive to analysis of the image and based on the performance of the plurality of keywords when used to select the content for presentation to the computing device, one or more image keywords from the plurality of keywords associated with the image based on the predetermined pattern of the object that matches the image;
identifying, by the data processing system, a plurality of content items having one or more keywords, the plurality of content items different from the image captured by the camera of the computing device, wherein each of the plurality of content items present audio output, and the plurality of content items are provided by one or more third party content providers;
determining, by the data processing system, a score for each of the plurality of content items based on a comparison of the one or more image keywords with the one or more keywords of each of the plurality of content items, wherein the score indicates a degree of match between the one or more image keywords and the one or more keywords of each of the plurality of content items;

selecting, by the data processing system based on the score for each of the plurality of content items, a content item comprising audio; and providing, by the data processing system to the computing device, the content item comprising the audio to cause the computing device to play the audio.

14. The method of claim 13, comprising:

determining, by the data processing system, an age for the one or more image keywords;

generating, by the data processing system for each of the plurality of content items, a weighted score based on the score for each of the plurality of content items and the age for the one or more image keywords; and selecting, by the data processing system, the content item based on the weighted score.

15. The method of claim 14, comprising:

determining, by the data processing system, the age for the one or more image keywords based on when the image was captured by the camera of the computing device relative to the determination to select content.

16. The method of claim 14, comprising:

determining, by the data processing system, the age for the one or more image keywords based on when the one or more image keywords were identified from the analysis of the image captured by the camera of the computing device relative to the determination to select content for presentation via the computing device.

17. The method of claim 14, comprising:

generating, by the data processing system, the weighted score via application of a weight to the score based on a decay function and the age of the one or more image keywords.

18. The method of claim 14, comprising:

receiving, by the data processing system, a request for content for presentation via the computing device;

determining, by the data processing system, to select the content for presentation via the computing device responsive to the request; and determining, by the data processing system, the age for the one or more image keywords based on when the one or more image keywords were identified from the analysis of the image captured by the camera of the computing device relative to the determination to select content for presentation via the computing device.

19. The method of claim 13, comprising:

receiving, by the data processing system, a request for content for presentation via the computing device; and determining, by the data processing system, to select the content for presentation via the computing device responsive to the request.

20. The method of claim 13, comprising:

identifying, by the data processing system, a request for content for presentation via the computing device; and determining, by the data processing system, to select the content for presentation via the computing device responsive to the identification of the request.

* * * * *